United States Patent Office 3,244,894
Patented Apr. 5, 1966

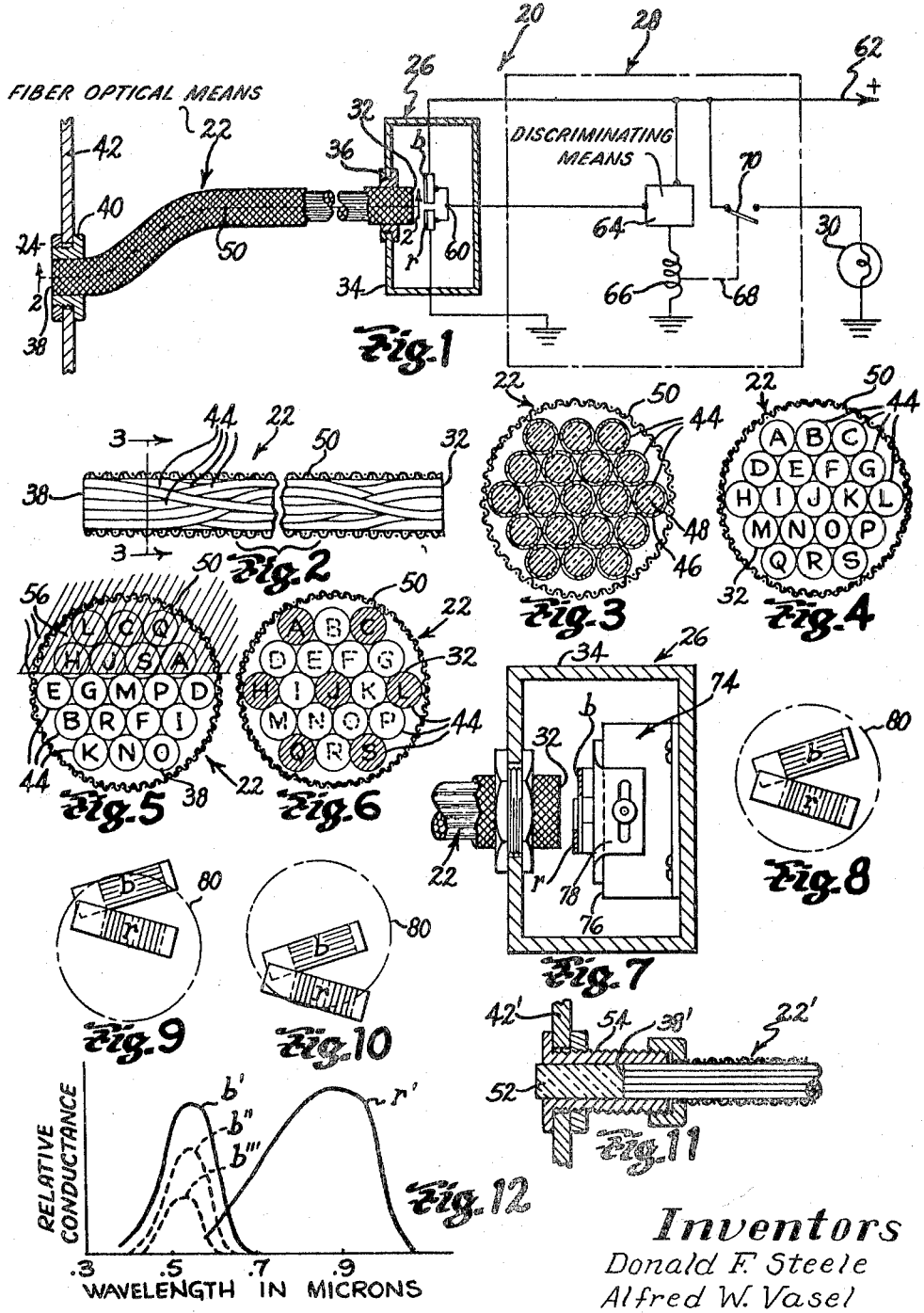

3,244,894
PHOTOELECTRIC DETECTION DEVICE UTILIZING RANDOMIZED FIBER OPTICAL LIGHT CONDUCTING MEANS
Donald F. Steele, Cohasset, and Alfred W. Vasel, Abington, Mass., assignors to American Pyrotector, Inc., Southbridge, Mass., a corporation of Massachusetts
Continuation of application Ser. No. 59,866, Oct. 3, 1960. This application Nov. 26, 1962, Ser. No. 240,091
5 Claims. (Cl. 250—227)

This application is a continuation of our application Serial No. 59,866 filed October 3, 1960, now abandoned.

This invention relates to heat-detection devices and has particular reference to apparatus for photoelectrically detecting remote high-intensity radiation sources such as flames or incandescent bodies.

In photoelectrically operated flame or heat-detection devices, the problems of spurious responses to harmless light sources such as sunlight or artificial light or shadow effects cast upon the sensing elements of such devices have been well recognized and in endeavoring to overcome these problems, detection equipment has, heretofore, become generally quite complicated, expensive and highly dependent upon critical and relatively frequent adjustment. Moreover, after having been directly exposed one or more times to flame heat or other high-intensity radiation sources, photosensitive materials in general tend to deteriorate and/or become destroyed.

Dependence upon detection equipment of the above character for repeated and unfailing accurate performance is of utmost importance, particularly in aircraft installations or under similar conditions where failure or spurious responses of the systems might lead to disastrous results.

Locating photosensitive detection devices as remotely as possible from their surveillance area relieves the possibility of damage or destruction thereof by immediate exposure to high-intensity radiation but, on the other hand, this measure of precaution has heretofore resulted in substantial losses in the transmission of light from the surveillance area which reduces the sensitivity and overall efficiency of the equipment. Furthermore, by such a practice, the possibility of disturbances in the operation of detector installations resulting from shadow effects caused by extraneous light or obstructions is greatly enhanced. Shadow lines or uneven areas of illumination cast upon photosensitive materials alter their normal response characteristics and, consequently, result in an imbalance and/or spurious response of their associated warning systems.

In contemplation of the difficulties relating to heat exposure and shadow effects or the like upon photosensitive detecting devices, the present invention, among other things, provides means for overcoming the above-mentioned problems.

Accordingly, it is a principal object of this invention to provide an improved radiation detector adapted for remote surveillance of potentially high-temperature areas and having exceptional reliability in operation.

Another object is to provide a device of the above character embodying a pair of photosensitive members each predominantly responsive to a different range of light frequencies and operatively electrically connected together in an electrical circuit for detecting characteristic changes in said members which result from the incidence of light upon said photosensitive means and discriminating means forming a part of said circuit for indicating the occurrence of certain characteristic changes in said photosensitive members which result from their exposure to specific predetermined frequencies of light.

Another object is to provide in a photosensitive detection device of the above character, novel means for transmitting light from the area of incidence of a flame or incandescence to a location remote therefrom for detection by said photosensitive members without encountering significant losses of light intensity during said transmission.

Another object is to provide light-transmitting means of the above character which is adapted to provide at its light-exit end, a substantially homogeneous average of all light intensities which are incident upon its light-entrance end.

A further object is to construct said light-transmitting means of a plurality of elongated flexible light-conducting fiber-like elements so randomly arranged in intertwined side-by-side relation as to provide differently geometrically patterned opposite end faces upon the assembly thereof.

Another object is to provide light-transmitting means of the above character which is flexible along its length and readily conformable to any reasonable irregular path for installation in congested areas where heat-detection equipment cannot be placed in direct line of sight with an area which is to be monitored thereby.

Another object is to provide apparatus of the above character which is adapted to detect combustion or incandescence in areas such as ovens or engine nacelles or the like where temperatures exceeding the deterioating temperatures of photo-sensitive materials are encountered as a part of normal operation.

A still further object is to provide in combination with the above, novel and simple means for adjusting the relative amounts of light transmitted to the photosensitive elements of the device for purposes of establishing a desired balanced operating condition of said photosensitive elements in their associated electrical system.

Other objects and advantages of the invention will become apparent from the following description when taken in conjunction with the accompanying drawings in which:

FIG. 1 is a diagrammatic illustration of a preferred form of the invention wherein electrical components and circuitry therefor are shown schematically;

FIG. 2 is an enlarged cross-sectional view of a part of the device shown in FIG. 1 taken substantially along line 2—2 in FIG. 1;

FIG. 3 is a further enlarged cross-sectional view taken on line 3—3 of FIG. 2;

FIG. 4 is a diagrammatic face view of one end of the part shown in FIG. 2 with the particular geometrical arrangement of its various elements indicated by lettering;

FIG. 5 is a view similar to FIG. 4 illustrating the geometrical configuration of the opposite end of the part shown in FIG. 2;

FIG. 6 is a view similar to FIG. 4 which, when taken with FIG. 5, diagrammatically illustrates a particular condition under which the device of the invention might be operated;

FIG. 7 is an enlarged view of a portion of the device of FIG. 1 showing a modification thereof;

FIGS. 8, 9 and 10 diagrammatically illustrate the function of the arrangement shown in FIG. 7;

FIG. 11 is a cross-sectional view of a modification of another part of the device embodying the invention; and FIG. 12 is a graph showing the photoelectric response curves of detection elements which may be used in the apparatus of this invention.

Referring more particularly to the drawings wherein like characters of reference designate like parts throughout the various views, the device 20 of the invention is shown in its simplest form by diagrammatic representation in FIG. 1 and various other more specific details of construction and arrangement of parts therefor are illustrated in the remaining figures of the drawings.

The basic components of the device 20, which will be subsequently described in more detail, consist of an elongated, preferably flexible light-conducting member 22 which functions to conduct light from a potentially high temperature zone 24 to a photosensitive light-detecting section 26 of the device 20. The section 26, through proper electrical connections with an electrical signal discriminating section 28, operates to activate a signal light 30 which indicates the existence or non-existence of a condition of incandescence or the presence of flame at the zone 24 under surveillance by the device 20. It will become apparent that a buzzer, horn, siren or any desired alarm or signaling means may be used as a substitute for the 30 which will be described herein for purposes of illustration only.

The detector section 26 embodies a pair of photoresistive elements $b$ and $r$ which are positioned adjacent the light-exit end 32 of the light-conducting member 22. The elements $b$ and $r$ are shielded from extraneous light sources by means of a suitable enclosure 34 into which the end 32 of the member 22 is extended and secured by a substantially light-tight coupling 36 of any suitable conventional construction.

The opposite, light-entrance end, 38 of the light-conducting member 22 is similarly extended through and secured by a coupling 40 to a partition 42 or the like enclosing the zone 24 which is to be viewed by the end 38 of the light-conducting member 22. The partition 42 may be the wall of a compartment, an engine cowling or any conceivable means for enclosing a potentially high-temperature area which is to be monitored by the device 20. In instances where no partitioning means exists between the zone 24 and the detector section 26, the member referred to as 42 would be in the form of a bracket arranged to support and properly direct the viewing end 38 of the member 22 toward a desired zone 24. Furthermore, with the light-conducting member 22 being flexible, as mentioned above, the part referred to as 42 might be movable and operated by conventional motion-imparting means to cause the end 38 of the member 22 to scan an extended area which would then be under surveillance by the device 20.

Referring in more detail to the structure of the light-conducting member 22, it will be seen in FIGS. 2–5 that said member embodies a plurality of flexible light-conducting fiber elements 44 bundled together in side-by-side randomly intermingled relation so as to provide at each of the opposite end faces 32 and 38 of the member 22 a different geometrical arrangement or patterning of the respective ends of the fibers 44. This feature of the invention which will be described in more detail hereinafter is to cause light which illuminates the entrance end 38, whether evenly or not as to intensity or differing wave lengths, to be emitted from the exit-end 32 a substantially homogeneous average of the entering light. That is, at all points on the light-exit end 32, the emitted light will be substantially an average in spectral frequency and intensity of the total light entering the member 22 at its viewing end 38.

The fibers 44 which have been shown as being of relatively large diameter, and relatively few in number for purposes of illustration only, would preferably be extremely small in diameter so as to require many thousands of fibers to fill a cross-sectional area of one square inch or less when intimately bundled together. For instance, their size might be such as to require one-quarter of a million fibers to fill one cross-sectional square inch.

Each of the fibers 44 are light-insulated from each other by individual outer claddings 46 which surrounds their light-conducting core parts 48. This prevents the effects of "cross-talk" or the interaction of light passing from one adjacent fiber to the other so as to assure the above-mentioned averaging out at one end, 32 of the light entering the opposite end, 38, of the member 22.

Since the fibers 44 must withstand relatively high temperatures without deterioration, particularly adjacent the end 38 of the member 20 and must be highly optically efficient in transferring light, they are preferably formed of optical glass with a core part 48 having a relatively high index of refraction and a thin outer cladding having a relatively low index of refraction for light-insulating purposes. Claddings of a thickness equal to or less than one-tenth the overall diameter of the fibers are generally considered suitable for this purpose. A typical fiber 44 might, for example, consist of a core part 48 formed of optical flint glass having an index of refraction of approximately 1.69 with a cladding of crown or soda-lime glass having an index of refraction of approximately 1.52.

As stated above, the fibers 44 are intimately bundled together while randomly arranged in side-by-side relation and for added protection from abrasion or other damaging effects, they are placed within a flexible tubular sheathing 50 formed of woven wire or metallic strands or the like. Other types of tubular sheathings such as plastic tubes, woven asbestos or the like may be used. Furthermore, if it is desired that the light-conducting path from the zone 24 to the detector section 26 be of a fixed rigid nature, the sheathing might then consist of a rigid pipe-like member preshaped to the desired contour of the said path.

In any event, the fibers 44 are optically finished at their opposite ends 32 and 38 to render them individually highly receptive to light entering or exiting therefrom and are prevented from becoming axially shifted or displaced relative to each other by being fused or otherwise securely connected together adjacent their opposite ends. While fusing is preferable for this purpose, certain tight-fitting clamps may be used or the fibers may be cemented together with an adhesive which is adapted to withstand relatively high temperature such as might be present in the zone 24, FIG. 1.

In instances where the normal operating temperature in the zone 24, FIG. 1, might be of such a degree as to cause possible damage to glass fibers such as 44, the light-receiving end of the bundle would be modified as shown in FIG. 11. In this case, the light-conducting member 22' being of the type described above with relation to the member 22, is provided with an end section or extension 52 of high heat-resisting light-conducting material such as quartz or Pyrex glass or the like. The extension 52 is placed in optical contact with the light-entrance face 38' of the member 22' and the two are held together by a suitable coupling 54 which is also utilized as means to connect the light-receiving or viewing end of the member 22' to an engine cowling or compartment wall or the like 42' in the manner shown and described above with relation to FIG. 1. Light from the zone 24 will then enter the member 22' after passing through the extension 52. Due to the relatively short length of the extension 52, transmission losses in light passing therethrough would be negligible.

With more particular regard to the random side-by-side arrangement of the fibers 44 which results in the above-mentioned differently geometrically patterned end faces 32 and 38 on the member 22, it can be seen that in FIGS. 4 and 5, this effect has been illustrated diagrammatically wherein each of the fibers have been shown by single circular outline and individually labeled with letters A–S to indicate the respective geometrical positions of their end faces at the opposite ends of the member 22.

The fibers 44 are arranged at the end 32 of the member 22 (FIG. 4) from left to right and downwardly, in consecutive order from A to S while their opposite ends are scrambled or incoherently arranged by an intertwining of the fibers throughout their length. That is, fiber A, at the extreme left in the top row (FIG. 4) has its opposite end located at the extreme right in the second row (FIG. 5) and fiber S at the extreme right in the bottom row (FIG. 4) has its opposite end located to the left of A in the second row (FIG. 5) and so on. It is pointed out that the particular geometrical arrangements of FIGS. 4 and 5 have been shown for purposes of illustration only, and that similar different geometrical arrangements may be used. The fibers may be arranged discretely, one at a time or in groups, to produce the desired different geometrical patterns at the faces 32 and 38.

Referring more particularly to FIGS. 5 and 6, there is further illustrated diagrammatically, the effects of a shadow (shown by the cross-sectioned area 56, FIG. 5) being cast across the light-receiving or viewing end 38 of the member 22. Considering that the shadow 56 represents light of a lower intensity or perhaps of different wave length than the light which is incident upon the remaining area of the face 38 (FIG. 5), it can be seen from FIG. 6 (which is an outline, like FIG. 4, of the face 32) that the shadow effect will be averaged out over the entire face 32 by the above-mentioned scrambling of the fibers. That is, it will become substantially a homogeneous average of all of the light emitted through the face 32. As shown in FIG. 5, the shadow 56 covers fibers L, C, Q, H, J, S, and A whose opposite ends at the face 32, as shown by shading in FIG. 6, are not grouped together as in FIG. 5 but are widely spaced from each other to average out the shadow effect.

From the above, it can be seen that with the light-conducting member 22 of the invention, all light which is incident upon the receiving end 38 thereof, whether of uniform or variable density, wave length and/or intensity as a result of shadow or other effects will be emitted at the light-exit end 32 as a substantially homogeneous average and will be received by the photoresistive elements $r$ and $b$ as such. Furthermore, because of the high optical efficiency of glass-clad glass light-conducting fibers of the type described above, no substantial transmission losses in transferring light from the zone 24 to the detector section 26 will result regardless of the length of the member 22 (within practical limits of in and around 200 feet or less) or irregularity of the path shape to which the member 22 might be contoured by bending for installations where congestion and obstacles must be avoided or circumvented.

The photoresistive elements $r$ and $b$ may consist of any one or combination of well-known light-sensitive materials which are characterized in that their conductance varies in accordance with the particular wave length characteristics of light which impinges upon them.

For purposes of illustration, the element $r$, in accordance with this invention, is selected to be of a substance which will increase positively in conductance when exposed to infra-red light substantially as indicated by the response curve $r'$ of FIG. 12. While cadmium selenide or lead sulfide or other compounds may be used, cadmium sulfide is preferable since its peak sensitivity, as shown by the curve $r'$ (FIG. 12) is below 1 micron and it does not have a spurious response to changes in environmental heat (e.g., atmospheric) which, like black body radiation, is in the far infra-red above 1 micron, it being understood that a portion of the radiation from incandescence or flame is in the near infra-red region below 1 micron.

The element $b$ is selected to be of a substance which is not only primarily positively responsive to light outside the above predetermined infra-red band but also responds opositely (negatively) by a decrease in conductance when exposed to infra-red radiation. A substance so characterized is monocrystalline cadmium sulfide whose normal response is indicated by the curve $b'$ (FIG. 12) while its negative response in two intensities of infra-red light are indicated qualitatively by the broken line curves $b''$ and $b'''$ (FIG. 12).

The combined detection and discriminating sections 26 and 28 which will distinguish between flame or incandescence and sunlight or environmental heat are arranged with the photoresistive elements $r$ and $b$ connected in series and having a common junction terminal 60 (FIG. 1).

When a controlled fixed potential is applied thereto at 62, the photoresistive elements $r$ and $b$ act as a variable voltage divider controlling the voltage at the junction 60 in accordance with their reaction to the particular light frequencies which are incident upon them. The voltage at the junction 60 is applied to a conventional amplifying or impedance matching device 64 which, in turn, controls gating means such as the coil 66 of a solenoid or the like which is mechanically connected as indicated by the broken line 68 to a switch 70 for energizing a signal light 30.

The circuit of the sections 26 and 28 operate in the following manner wherein all values for the components thereof are given by way of example only. With the gating device 66 selected to be of such character as to activate the switch 70 on 10 volts and with the impedance of the combined gating device 66 and impedance matching device 64 selected to be of approximately 1 megohm while the elements $r$ and $b$ are characterized to have approximately equal resistances (inverse of conductance) in darkness of 100 megohms, the resistance of the element $b$ and the parallel gating circuit will be approximately that of the parallel circuit, namely, one megohm (1M). A 28-volt potential applied at 62 across the elements $r$ and $b$ and parallel circuits will then be divided by approximately 100 (with elements $r$ and $b$ in darkness) to provide at the junction 60 a 0.28 volt potential which is well below the threshold for the gating device 66 which was said to open at 10 volts.

Thus, in darkness (where no light is produced at zone 24, FIG. 1) the voltage at the junction 60 is inadequate to activate the gating device 66 and the light 30 is consequently not illuminated.

This photoelectric action in darkness is compared in the following table with the action under light conditions:

|  | Dark | Sunlight | Flame radiation and sunlight |
|---|---|---|---|
| Impedance of element r (Zr) | 100M | 60K | 15K |
| Impedance of element b (Zb) | 100M | 10K | 15K |
| Zb and 1M | 1M | 10K | 15K |
| Voltage at junction 60 | 0.28 | 4 | 14 |

In instances where sunlight, having an infrared as well as visible light composition, exists at the zone 24 and is transferred by the member 22 to the elements $r$ and $b$, the voltage will rise by virtue of a characteristic decrease in the resistance of the element $b$ to 10K ohms or one-hundredth that of the parallel circuit (1M). However, the element $r$ will also become more conductive by a drop in its resistance to 60K ohms, for example, so that from the relationship $$\frac{b}{r+b} \times 28$$

which will give the voltage at the junction 60, for example, would be $$\frac{10}{60+10} 28 = 4 \text{ volts}$$

This 4 volts is still below the threshold of 10 volts for operating the gating device 66 and the signal light 30 will not be energized.

If, however, a flame or incandescence with a high infrared component exists at the zone 24 and its radiation is transferred to the elements $r$ and $b$, the element $r$ not only becomes more conductive by a drop in its resistance, but the element $b$ becomes less conductive by an increase in its resistance and by the above-mentioned voltage dividing effect of the elements $r$ and $b$, the voltage at their junction 60 increases, for example, to $$\frac{15}{15+15}28 = 14 \text{ volts}$$

(see the above table for the given examples of resistance values for the elements $r$ and $b$). This voltage being above the threshold of 10 volts causes the gating device 66 to open and actuate switch 70 which closes the circuit to the signal light 30 and illuminates the same. Thus, by the illumination of the signal light 30, it is indicated that flame or incandescence is present in the zone 24.

It should be understood that the above values have been arbitrarily selected only for purposes of illustration. Furthermore, the circuitry of the section 28 has been shown in its simplest form, there being many obvious possibilities for refinement thereof.

With reference to the above examples of resistance values given to $r$ and $b$ which determine their ratios of sensitivity to sunlight versus fire radiation and give the resultant output voltages at the junction 60 of 4 volts for sunlight and 14 volts for fire radiation, it is pointed out that these outputs can be adjusted or varied by controlling the relative sizes of the sensitive areas of the elements $r$ and $b$ which are subjected to the radiation. The relative sizes of the areas exposed to radiation determine the resistance values of the elements $r$ and $b$ under different light conditions and thus their ratios of sensitivity to sunlight versus fire radiation can be controlled.

Heretofore, where elements such as $r$ and $b$ have been openly exposed to radiation, rather than shielded and exposed to said radiation from a restricted area such as the exit-end 32 of the member 22 in FIG. 1, it has been the practice to adjust the ratio of sensitivity of the elements $r$ and $b$ by mechanical cutting of the sensitive areas of the said elements so as to cause the relative resultant sizes of said areas to each receive predetermined quantities of light. Mechanical cutting of photosensitive materials such as described above is obviously an extremely delicate and difficult task, particularly since the sensitive areas of the elements $r$ and $b$ are usually each in the order of small fractions of a square inch. Attempting to obtain accurate ratios of sensitivity by mechanical cutting operations usually results in a trial and error procedure which is time-consuming, tedious and expensive with little assurance of complete success.

The present invention overcomes the problems relating to adjusting the fire radiation and sunlight output voltages of the elements $r$ and $b$ by making a simple adjustment of the elements $r$ and $b$ relative to the light-exit end 32 of the light-transfer device 22 as shown in FIGS. 7–10.

In FIG. 7, there is shown a modification of the detector section 26 of the device 20 wherein, within the enclosure 34 there is provided an adjustable mount 74 for photosensitive elements $r$ and $b$.

The amount 74 embodies a fixed slideway 76 upon which is provided a slidable carrier 78 for the elements $r$ and $b$. The photosensitive elements $r$ and $b$ are cemented or otherwise fixed to the slide 78 with their sensitive areas disposed one above the other and facing the light-exit end 32 of the member 22 as shown in FIGS. 7 and 8–10. By adjusting the slide up or down, it can be seen that more or less of the light from the member 22 can be directed onto one or the other of the elements $r$ and $b$ as required in accordance with the ratios of sensitivity desired of said elements.

For example, if a 1 to 1 ratio of sensitivity is desired and the element $b$ is more sensitive than the element $r$, the slide 78 would be raised to decrease the sensitivity of the element $b$ by exposing less of its effective surface to light from the exit face 32 of the member 22. This condition is diagrammatically illustrated in FIG. 9 wherein the circular dot-dash outline 80 represents the area of illumination from the light-exit end 32 of the member 22.

If, however, the element $r$ is more sensitive than the element $b$ and the unity ratio is desired, then the slide 78 is lowered to move the effective surface of the element $r$ partially out of the area of illumination 80 as shown in FIG. 10.

FIG. 8 illustrates a condition where equal quantities of light will illuminate the elements $r$ and $b$.

It is pointed out that while the mount for the photosensitive elements has been shown as being adjustable relative to the light-transferring member 22, the reverse may be true. That is, the end 32 of the member may be rendered adjustable relative to the mount for the photosensitive elements or both may be adjustable.

As an example of the above ratios of sensitivity, with a 0.10 to 1 change in the resistance of the element $b$ to sunlight versus fire radiation, the element $b$ is 10 times as sensitive as the element $r$ which might be characterized to have a 1 to 1 sunlight versus fire radiation factor. In such case, with a 28-volt potential applied at 62 in FIG. 1, the output voltage at the junction 60 (when the cells are subjected to sunlight) would be $$\frac{b}{r+b} \times 28 \text{ volts} = \frac{.1}{1+.1} = 2.5 \text{ volts output}$$

Thus, with the gating device 64 set to operate at 10 volts, as described above, the device 20 would not respond to sunlight.

With the same sensitivity ratio of the elements $r$ and $b$, however, when exposed to flame radiation with the same 28 volt potential at 26 in FIG. 1, the output voltage at the junction 60 would be $$\frac{b}{r+b} \times 28 \text{ volts} = \frac{1}{1+1} \times 28 \text{ volts} = 14 \text{ volt output}$$

This being greater than the 10-volt threshold causes the gating device 64 to operate and close the switch 70 and energize the signal light 30 to indicate the presence of flame radiation.

From the foregoing, it can be seen that improved, simplified and economical means have been provided for accomplishing all of the objects and advantages of the invention. However, it should be readily apparent that many changes in the details of construction and arrangement of parts may be made without departing from the spirit of the invention as expressed in the accompanying claims and the invention is not to be limited to the exact matters shown and described as only the preferred matters have been given by way of illustration.

What is claimed is:

1. A device of the character described comprising the combination of at least two photosensitive elements, one element being predominantly responsive to a predetermined band of frequencies of the light spectrum and the other element being predominantly similarly responsive to a substantially different band of light frequencies and oppositely responsive to said predetermined band of frequencies, means connecting said elements in series and with a common junction in a current carrying circuit, electrical discriminating means responsive to characteristic changes in voltage connected to said common junction and to one of said photosensitive elements in such manner as to place said discriminating means electrically in parallel relation with said one of said elements and a single fiber optical light-conducting member embodying a plurality of elongated relatively thin and flexible light-conducting fibers each having a light-transmitting core and a light-insulating cladding, said fibers being grouped in relatively intimate side-by-side intertwined relation throughout their length to form, by the composite relationship of their respective opposite ends, a light-receiving face at one end of said member having a different geometrical patterning of its fiber ends than that of a light-emitting face at the other end of said member so that said member is adapted to receive light impinging upon various parts of said light-receiving face with any degree of intensity and to emit said light from said light-emitting face wth a uniform average intensity over all parts of said light-emitting face, said light-conducting member being positioned with its light-receiving face adjacent a single remote area under surveillance by said device and with its light-emitting face adjacent said photosensitive elements to direct light from said remote area onto said elements with substantially uniform intensity.

2. A device of the character described comprising the combination of at least two photosensitive elements, one element being predominantly responsive to a predetermined band of frequencies of the light spectrum and the other element being predominantly similarly responsive to a substantially different band of light frequencies and oppositely responsive to said predetermined band of frequencies, means connecting said elements in series and with a common junction in a current carrying circuit, electrical discriminating means responsive to characteristic changes in voltage connected to said common junction and to one of said elements in such manner as to place said discriminating means electrically in parallel relation with said one of said elements, and a single fiber optical light-conducting member embodying a plurality of elongated relatively thin and flexible light-conducting fibers each having a light-transmitting core and a light-insulating cladding, said fibers being grouped in relatively intimate side-by-side intertwined relation throughout their length to form, by the composite relationship of their respective opposite ends, a light-receiving face at one end of said member having a different geometrical patterning of its fiber ends than that of a light-emitting face at the other end of said member so that said member is adapted to receive light impinging upon various parts of said light-receiving face with any degree of intensity and to emit said light from said light-emitting face with a uniform average ntensity over all parts of said light-emitting face, means for supporting said light-receiving face adjacent a single remote area to be under surveillance by said device for receiving light from said area, means for supporting said light-emitting end face of said light-conducting member and said photosensitive elements in adjacent facing relation with each other with said elements being laterally adjustable relative to said light-emitting face of said light-conducting member for selecting the ratio of amounts of light from said area which can impinge upon respective elements, and means for shielding said photosensitive elements from extraneous light.

3. A device of the character described comprising the combination of at least two photosensitive means which are characteristically responsive by a change in electrical properties to different frequency bands of the light spectrum, a detection circuit associated with said photosensitive means, means in said circuit for detecting the change in electrical properties of said photosensitive means to light impinging thereupon, and a fiber optical light-conducting cable embodying a plurality of light piping fibers for transferring light from a location under surveillance onto each of said photosensitive means, the fibers at a first end of the cable forming a first face for receiving light from said remote location, and having their opposite ends forming a second face to which the photosensitive means are exposed, the ends forming said second face being so randomly oriented in relation to the orientation of the corresponding ends at said first face that light impinging non-uniformly on said first face emanates substantially uniformly from said second end.

4. A radiation detector, comprising a fiber optical light conducting cable embodying a plurality of light piping fibers, the fibers at a first end of said cable being adapted to receive light from a location under surveillance, a pair of detector cells arranged to view the other end, the fibers of the cable at said other end being randomly oriented in relation to their orientation at the first end, whereby light impinging non-uniformly on said first end emanates substantially uniformly from said second end, and is received substantially equally by said detector cells.

5. A radiation detector as in claim 4 in which said cells are responsive to different frequency bands of the light spectrum.

References Cited by the Examiner
UNITED STATES PATENTS

| | | | |
|---|---|---|---|
| 1,751,584 | 3/1930 | Hansell | 250—227 X |
| 1,963,185 | 6/1934 | Wilson | 250—226 X |
| 2,196,166 | 4/1940 | Bryce | 250—227 X |
| 2,840,146 | 6/1958 | Ray | 250—226 X |
| 2,961,542 | 11/1960 | Cartwright et al. | 250—83 |
| 3,043,179 | 7/1962 | Dunn | 250—227 X |
| 3,051,035 | 8/1962 | Root | 250—227 X |
| 3,051,166 | 8/1962 | Havnanian | 250—227 X |
| 3,101,411 | 8/1962 | Richards | 250—227 X |

RALPH G. NILSON, *Primary Examiner.*

ARCHIE R. BORCHELT, *Examiner.*

E. STRICKLAND, M. A. LEAVITT,
*Assistant Examiners.*